US006763192B1

(12) United States Patent
Jagannathan

(10) Patent No.: US 6,763,192 B1
(45) Date of Patent: Jul. 13, 2004

(54) INTEGRATION OF ALL-OPTICAL CROSSCONNECT FUNCTIONALITY IN AN OPTICAL PACKET SWITCHING APPARATUS

(75) Inventor: Rajesh S. Jagannathan, Plano, TX (US)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/519,066

(22) Filed: Mar. 3, 2000

(51) Int. Cl.[7] ............................................. H04J 14/00
(52) U.S. Cl. ............................. 398/54; 398/51; 398/55
(58) Field of Search ................................. 359/320, 388; 370/351, 902, 355, 360; 398/54, 55, 51

(56) References Cited

U.S. PATENT DOCUMENTS

| | | | |
|---|---|---|---|
| 5,416,769 A | 5/1995 | Karol | 370/60 |
| 5,469,284 A | 11/1995 | Haas | 359/139 |
| 5,486,943 A | 1/1996 | Sasayama et al. | 359/123 |
| 5,734,486 A | 3/1998 | Guillemot et al. | 359/139 |
| 5,737,106 A | 4/1998 | Sansonetti et al. | 359/140 |
| 5,771,320 A | 6/1998 | Stone | |
| 5,781,537 A * | 7/1998 | Ramaswami et al. | 370/254 |
| 5,828,472 A | 10/1998 | Masetti | |
| 6,075,630 A * | 6/2000 | Nishio | 398/25 |
| 6,118,762 A * | 9/2000 | Nomura et al. | 370/230 |
| 6,278,712 B1 * | 8/2001 | Takihiro et al. | 370/400 |
| 6,563,793 B1 * | 5/2003 | Golden et al. | 370/236 |
| 6,671,256 B1 * | 12/2003 | Xiong et al. | 370/230 |

OTHER PUBLICATIONS

J. Wei, "Connection Management for Multiwavelength Optical Networking", IEEE Journal on Selected Areas in Communications, vol. 16, No. 7, Sep. 1998.*
Y. Chen et al., "WDM Burst Switching for Petabit Capacity Routers", IEEE, 1999.*
G. Hudek et al., "Signaling Analysis for a Multi–Switch All–Optical Network", IEEE, 1995.*

*A Flexible Cross–Connect Network Using Multiple Optical Carriers*, by G. Depovere, et al. of Philips Research Laboratories, The Netherlands and N. Wauters, et al. of IMEC–LEA, University of Gent, Belgium (4 pgs.).
Tamil, et al.; Analysis of All–Optical Routers; Proceedings of SPIE; Nov. 3–5 1998; pp. 456–464; vol. 3531.
Hunter, et al.; SLOB: A Switch with Large Optical Buffers for Packet Switching; Journal of Lightwave Technology; Oct. 1998; pp. 1725–1736; vol. 16, Iss. 10.
Guillemot, et al.; Optical Packet Switching for WDM IP Gigabit Routers; 24th European Conference on Optical Communication; Sep. 20–24, 1998; pp. 433–434; vol. 1.
Hansen, et al.; Optical Packet Switching Without Packet Alignment; 24th European Conference on Optical Communication; Sep. 20–24, 1998, pp. 591–592; vol. 1.
Z. Haas; The Staggering Switch: An Electronically Controlled Optical Packet Switch; Journal of Lightwave Technology; May–Jun. 1993; pp. 925–936; vol. 11, Iss. 5.

* cited by examiner

*Primary Examiner*—Leslie Pascal
*Assistant Examiner*—Shi K. Li
(74) *Attorney, Agent, or Firm*—Gray Cary; Jessica W. Smith; V. Lawrence Sewell

(57) ABSTRACT

A network manager begins to integrate optical crossconnect functionality in an optical packet switching apparatus by transmitting a request to a resource management mechanism for allocation for an output port with respect to an input port in an optical switching matrix. The resource management mechanism then queries a port availability database to determine the availability of the requested output port. If an output port is available, the resource management mechanism then reserves the requested output port. The resource management mechanism then transmits mapping information for an optical path between the input port and the reserved output port to an optical switch control mechanism. The optical switch control mechanism then creates the optical path between the said input port the reserved output port. Finally, the optical switch control mechanism informs the resource management mechanism that the optical path is established.

19 Claims, 3 Drawing Sheets

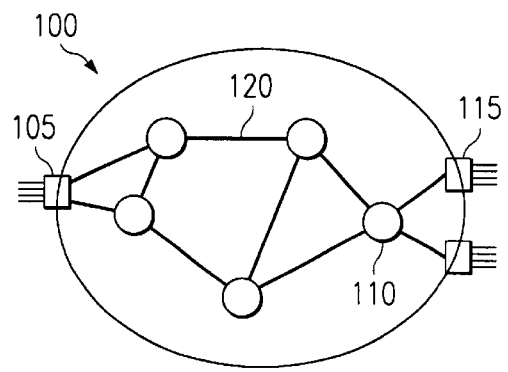
FIG. 1
(PRIOR ART)
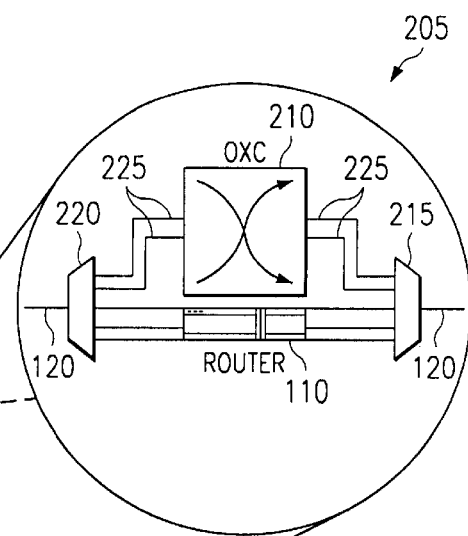
FIG. 2
(PRIOR ART)
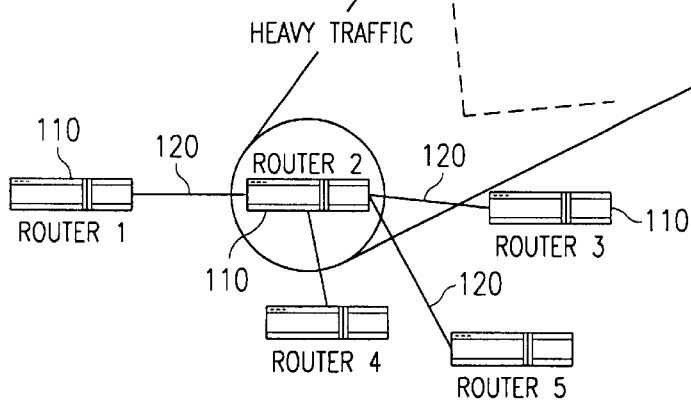

INTEGRATION OF ALL-OPTICAL CROSSCONNECT FUNCTIONALITY IN AN OPTICAL PACKET SWITCHING APPARATUS

TECHNICAL FIELD OF THE INVENTION

The present invention relates generally to optical network systems, and more particularly to a system and method for integrating optical crossconnect functionality in an optical packet switching apparatus.

BACKGROUND OF THE INVENTION

Data traffic over networks, particularly the internet, has increased dramatically over the past several years, and this trend will continue with the introduction of new services which require more bandwidth. Over time and technological advancements the bandwidth bottleneck kept shifting between the transmission and switching. Now transmission technology has advanced to a level that the routers, which essentially switch packets, have become bottlenecks. The advance of Wavelength Division Multiplexing (WDM) has enabled overcome this transmission bottleneck. The enlarged volume of internet traffic requires a network with high transmission capacity and high capacity routers capable of routing data packets at a very high rate. One option is to use all-optical routers.

Advances in optical component technology had made it possible to make optical switching elements such as a Semiconductor Optical Amplifier (SOA) that would be electrically controlled to switch at nano-second response range. So a switching matrix made of a number of SOAs and controlled by routing protocols and a resource management software or hardware will enable all optical routers to act as a synchronous or asynchronous fixed or variable length packet switching apparatus.

One approach called burst switching attempts to make the best use of optical switching and electronic/software router technologies. It becomes feasible to implement an all-optical packet switching apparatus using burst switching technique. It creates a burst switched network with conventional packet switching devices such as routers with a special function at the ingress and egress points (edge) of this burst switched network. The special function to be performed by the edge packet switching devices would be assembly of multiple packets into one payload and send it into the burst switching network as a burst. Similarly they would unassemble packets in an incoming burst payload and send them as conventional packets outside of the burst switched network. When it is in the process of assembling bursts into a payload it would already have sent a header to the appropriate all-optical packet switch through which all the packets assembled into the payload has to pass through. The header would contain information about the contents, the arrival port and the destination port(s), the length of the burst payload etc. The all-optical packet switching device would receive this header and process it electronically and keep the switching matrix ready for an interval of time to allow the corresponding payload that would follow later at a known time instance to switch over to the right exit port.

Optical crossconnects on the other hand are not restricted to packets. They are devices that just make interconnections between an input port and output port to facilitate the establishment of light paths between devices connected to these two ports. They do not examine the packets that pass through them nor do they switch individual packets. Optical crossconnects are primarily used to establish steady optical paths between two circuit switching or packet switching devices. They also use a optical switching matrix to establish this connectivity. Currently, optical packet switching devices and optical crossconnects are two physically separate systems having separate switching hardware and software with possible interoperable ports for interconnection.

SUMMARY OF THE INVENTION

The present invention provides an optical network that substantially eliminates or reduces disadvantages and problems associated with previously developed optical networks used for switching data.

More specifically, the present invention provides a method for integrating optical crossconnect functionality in an optical packet switching apparatus. To integrate optical crossconnect functionality in an optical packet switching apparatus, a network manager begins by transmitting a request to a resource management mechanism for allocation for an output port with respect to an input port in an optical switching matrix. The resource management mechanism then queries a port availability database to determine the availability of the requested output port. If an output port is available, the resource management mechanism then reserves the requested output port. The resource management mechanism then transmits mapping information for an optical path between the input port and the reserved output port to an optical switch control mechanism. The optical switch control mechanism then creates the optical path between the said input port the reserved output port. Next, the optical switch control mechanism then informs the resource management mechanism that the optical path is established.

The present invention provides an important technical advantage by providing a method for integrating optical crossconnect and packet switching functionality in a single optical packet switching apparatus, thus reducing the number of components and cost.

The present invention provides another technical advantage by providing an optical packet switching apparatus with optical crossconnect function which works for any fixed length, variable length, synchronous, or asynchronous optical packet.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 1 shows one example of an optically linked network 100;

FIG. 2 shows a prior art view illustrating the current method for providing optical crossconnect and optical packet switching functionality in an optically linked network;

DETAILED DESCRIPTION OF THE INVENTION

Figure 3:
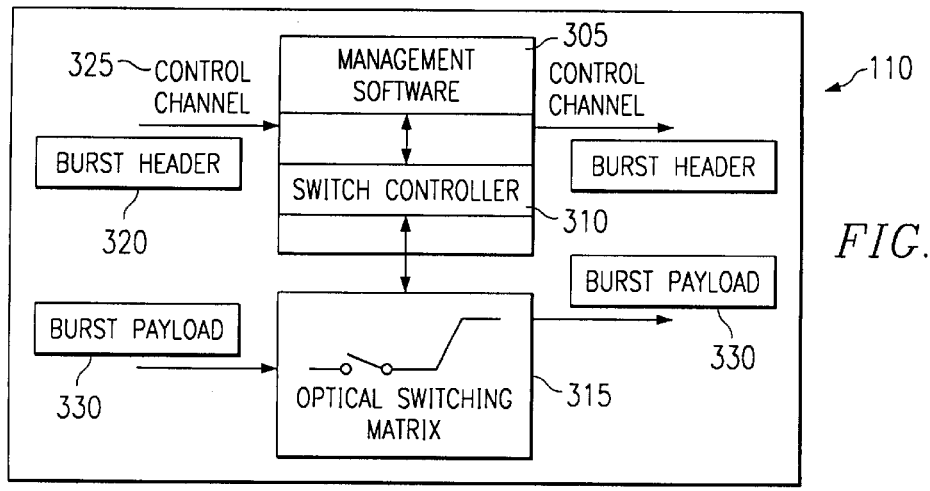
FIG. 3 shows an optical core router having its own management software, switch controller 310, and optical switching matrix.

Preferred embodiments of the present invention are illustrated in the FIGUREs, like numerals being used to refer to like and corresponding parts of the various drawings.

A network manager begins to integrate optical crossconnect functionality in an optical packet switching apparatus by transmitting a request to a resource management mechanism for allocation for an output port with respect to an input port in an optical switching matrix. The resource management mechanism then queries a port availability database to determine the availability of the requested output port. If an output port is available, the resource management mechanism then reserves the requested output port. The resource management mechanism then transmits mapping information for an optical path between the input port and the reserved output port to an optical switch control mechanism. The optical switch control mechanism then creates the optical path between the said input port the reserved output port. Finally, the optical switch control mechanism informs the resource management mechanism that the optical path is established. The reserved input and output ports are not available for the optical router part of the mechanism until the are made available to the router.

FIG. 1 shows one example of an optically linked network 100. The optically linked network 100 includes multiple electronic ingress edge routers 105, multiple optical core routers 110, multiple electronic egress edge routers 115, and multiple optical links 120. The optical links 120 connect the electronic ingress edge routers 105, the optical core routers 110, and the electronic egress edge routers 115 together. The electronic ingress edge routers 105 and electronic egress edge routers 115 serve as legacy interfaces between the optically linked network 100 and conventional electronic routers. The optical core routers 110 serve as packet switching devices. Each optical core router 110 examines every packet passing through it and routes the packets to their proper destination.

In some cases, it is not necessary that each optical core router 110 examine and process each and every packet passing through it. For example, as shown in FIG. 2, the data packets normally have to pass through optical core router two to get to optical core router three. If eighty percent (80%) of the packets originating in optical core router one have a destination of optical core router three, then there is no need for the same eighty percent of the packets to be examined or processed in optical core router two. An optical crossconnect 210 can be placed above optical core router two to route the same eighty percent of the traffic around optical core router two. Routing eighty percent of the packet traffic which does not need to be processed by optical core router two around optical core router two effectively reduces the number of fibers which need to be active for processing packets. FIG. 2 also shows a close up view 205 of how an optical crossconnect 210 and optical core router 110 currently work together to route traffic around the optical core router two. As shown in the close up view 205 of FIG. 2, the crossconnect (OXC) 210 and optical core router 110 are two separate devices. Optical link 120 enters a multiplexor/demultiplexor 220 and is divided into multiple fiber lines entering both the optical crossconnect 210 and the optical core router 110. All packets which need not be processed in optical core router 110 can be routed through the crossconnect through fiber lines 225, multiplexed/demultiplexed at the multiplexor/demultiplexor 215 and transmitted on to optical core router three on optical link 120.

The current solution requires both an optical crossconnect and an optical core router to have their own switching matrix, management software, power source, and internal optical amplifiers. FIG. 3 shows an optical core router 110 having its own management software 305, switch controller 310, and optical switching matrix 315. A burst header 320 enters the optical core router 110 through control channel 325. The management software 305 electronically processes the mapping information within the burst header 320 and transmits that mapping information to the switch controller 310. The switch controller 310 then transmits the mapping information to the optical switching matrix 315. The mapping information directs the switch controller 310 to establish a switched optical path in the optical switching matrix 315 between any two ports on demand for a specific period of time to enable the passage of a burst payload 330 between the desired input and output ports.

Figure 4:
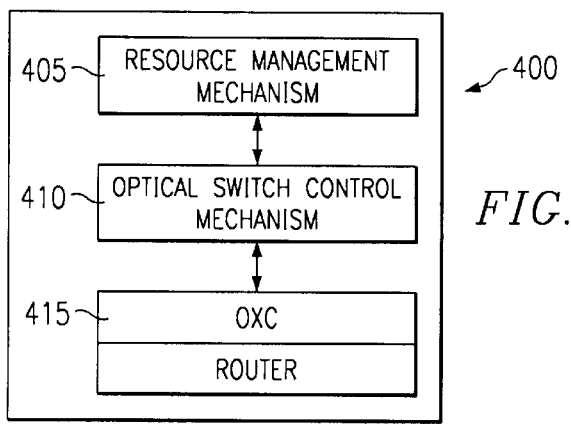
FIG. 4 shows one example of an optical packet switching apparatus having integrated optical crossconnect and optical packet switching functionality.

A better solution is have an optical packet switching apparatus which functions as an optical crossconnect and an optical router with only one optical switching matrix and one integrated management software program. This idea is illustrated in FIG. 4. FIG. 4 shows an optical packet switching apparatus 400 having an integrated optical crossconnect/optical core router 415. The integrated optical crossconnect/optical core router 415 is controlled by one management software program 405 and one optical switch control mechanism 410. Furthermore, the optical crossconnect/optical core router 415 use only one optical switching matrix 315.

Figure 5:
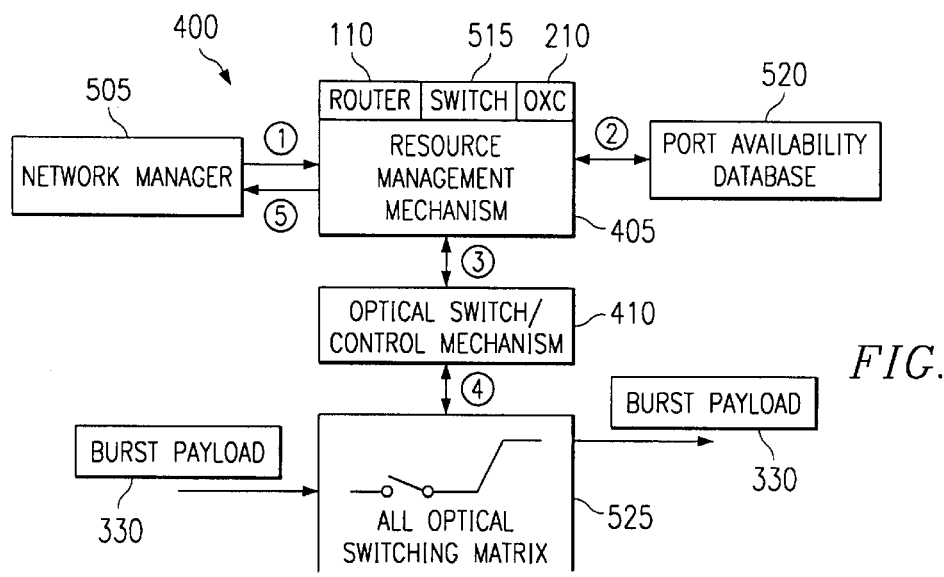
FIG. 5 shows one example of a functional diagram for the optical packet switching apparatus.

FIG. 5 shows one example of a functional diagram for the optical packet switching apparatus 400 which integrates optical crossconnect and optical packet switching functionality in a single optical packet switching matrix. The optical packet switching apparatus 400 includes a network manager 505, a resource management mechanism 405, a port availability database 520, an optical switch control mechanism 410, and an optical switching matrix 525. The resource management mechanism 405 can either be a software computer program or a hardware device. Furthermore, the resource management mechanism 405 can function as an optical core router 110, a switch 515, or an optical crossconnect (OXC) 210.

When the resource management mechanism 405 is functioning as a router, it transmits detailed mapping information to the switch control mechanism 410 on how to map an optical path from an input to an output port in the optical switching matrix 525. The optical path allows a particular burst payload 330 to be switched through the optical switching matrix 525 to its proper destination. The mapping information also includes how long the optical path should remain open. In most cases, when the resource management mechanism 405 is functioning as a an optical core router 110, the optical path remains open only for the amount of time required to switch a particular burst payload 330 through the optical switching matrix 515. However, in situations where a large number of packets need not be processed and simply need to pass through a particular optical core router 110, the resource management mechanism 405 can also function as an optical crossconnect 210.

Figures 6, 7:
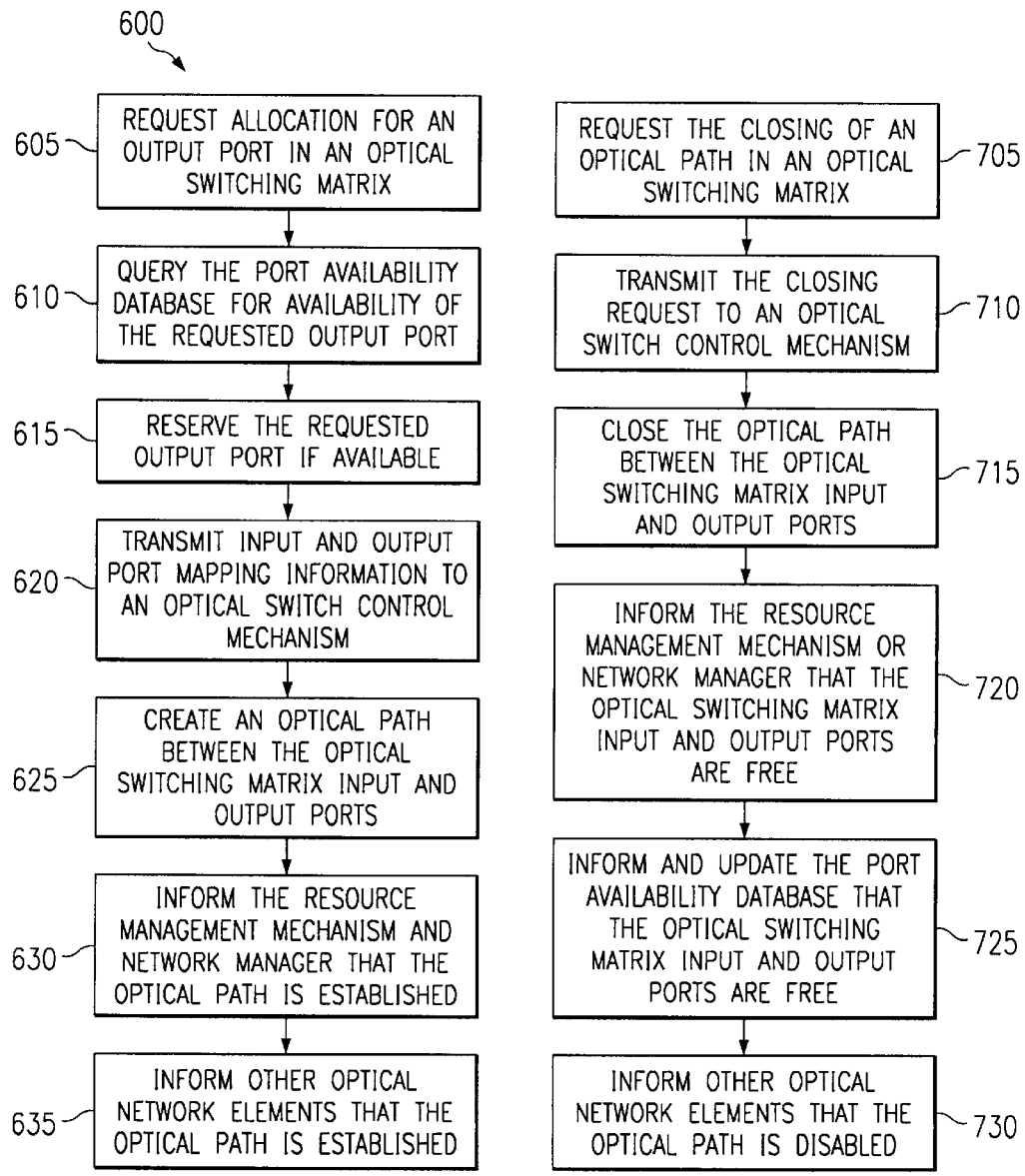
FIG. 6 shows a flow diagram illustrating a set of steps that enable crossconnect functionality in an optical packet switching apparatus.
FIG. 7 shows a flow diagram illustrating a set of steps that disable crossconnect functionality in an optical packet switching apparatus 400.

FIG. 6 shows a flow diagram 600 illustrating a set of steps that enable crossconnect functionality in an optical packet switching apparatus 400. The optical packet switching apparatus 400 can be any all optical packet switching apparatus or any fixed or variable length synchronous optical packet switching apparatus. In step 605, a network manager 505 begins by transmitting a request to the resource management mechanism 405 for allocation of an output port with respect to a given input port in the optical packet switching matrix 525. The network manager 505 can either be a software program or a person controlling the optical network 100. The resource management mechanism 405 then queries the port availability database 520 to determine the availability of the requested output port in step 610. The port availability database tracks which optical packet switching matrix inputs and outputs are currently being used, which input and output ports are being used as optical crossconnects, and which input and output ports are free. If the requested output port is available, then the port availability database 520 transmits mapping information back to the resource management mechanism 405 and the resource management mechanism 405 reserves the output port in step 615.

After reserving the output port, the resource management mechanism 405 then transmits the optical switching matrix input and output mapping information to the optical switch control mechanism 410 in step 620. Next, the optical switch control mechanism 410 creates an optical path between the optical switching matrix input and output ports in step 625. The optical switch control mechanism 410 then informs the resource management mechanism 405 and the network manager 505 that the optical path has been established in step 630. Finally, the resource management mechanism 405 or the network manager 505 can optionally inform other network elements in the optical network system 100 that the optical path has been established in step 635. However, if the requested output port is not available, the port availability database 520 transmits that information to the resource management mechanism and the network manager. The network manager can then inquire on the availability of another output port.

FIG. 7 shows a flow diagram illustrating a set of steps that disable crossconnect functionality in an optical packet switching apparatus 400. In step 705, a network manager 505 begins by transmitting a request to the resource management mechanism 405 to close an optical path from an input port to an output port within the optical packet switching matrix 525. The resource management mechanism 405 then transmits the closing request to the switch control mechanism 410 to free the input and output ports of the optical path in step 710. The switch control mechanism 410 then closes the optical path between the optical packet switching matrix input and output ports in step 715. The switch control mechanism 410 then informs the resource management mechanism 405 and the network manager 505 that the optical packet switching matrix input and output ports are free in step 720. Next, the resource management mechanism 405 or network manager 505 updates the port availability database 520 that the input and output ports are now free in step 725. Finally, the resource management mechanism 405 or the network manager 505 can optionally inform other network elements in the optical network system 100 that the optical path has been disabled in step 730.

In summary, to integrate optical crossconnect functionality in an optical packet switching apparatus, a network manager begins by transmitting a request to a resource management mechanism for allocation for an output port with respect to an input port in an optical switching matrix. The resource management mechanism then queries a port availability database to determine the availability of the requested output port. If an output port is available, the resource management mechanism then reserves the requested output port. The resource management mechanism then transmits mapping information for an optical path between the input port and the reserved output port to an optical switch control mechanism. The optical switch control mechanism then creates the optical path between the said input port the reserved output port. Next, the optical switch control mechanism then informs the resource management mechanism that the optical path is established.

Although the present invention has been described in detail, it should be understood that various changes, substitutions and alterations can be made hereto without departing from the spirit and scope of the invention as described by the appended claims.

What is claimed is:

1. A method for integrating optical crossconnect functionality in an optical packet switching apparatus, comprising the steps of:

requesting allocation for an output port with respect to an input port in an optical packet switching matrix for a specific period of time;

querying a port availability database to determine the availability of said requested output port, wherein the port availability database tracks which inputs and outputs of the optical packet switching matrix are currently being used and whether such inputs and outputs are being used as optical crossconnects;

reserving said requested output port if available;

transmitting mapping information for an optical path between said input port and said reserved output port to an optical switch control mechanism;

creating said optical path between said input port and said reserved output port; and informing a resource management mechanism that said optical path is established, wherein said resource management mechanism functions as an optical core router and as an optical crossconnect, and wherein said resource management mechanism transmits mapping information on the specific period of time that the optical path should remain open to the optical packet switching matrix when functioning as an optical core router.

2. The method of claim 1, further comprising the steps of:

informing a network manager that said requested output port is not available;

informing said network manager that said optical path is established; and informing a plurality of network elements in an optical network that said optical path has been established.

3. The method of claim 2, wherein said network manager requests allocation for said requested output port.

4. The method of claim 2, wherein said network manager is a software program controlling said optical network.

5. The method of claim 2, wherein said network manager is a person controlling said optical network.

6. The method of claim 1, wherein said resource management mechanism queries said port availability database to determine the availability of said requested output port.

7. The method of claim 1, wherein said resource management mechanism reserves said requested output port.

8. The method of claim 1, wherein said resource management mechanism transmits said mapping information to said optical switch control mechanism.

9. The method of claim 1, wherein said optical switch control mechanism creates said optical path between said input port and said reserved output port in said optical switching matrix.

10. The method of claim 1, wherein said optical switch control mechanism informs said resource management mechanism that said optical path has been established.

11. The method of claim 2, wherein said port availability database informs said network manager that said requested output port is not available.

12. The method of claim 2, wherein said resource management mechanism informs said plurality of network elements in said optical network that said optical path has been established.

13. The method of claim 2, wherein said network manager informs said plurality of network elements in said optical network that said optical path has been established.

14. The method of claim 1, wherein said port availability database tracks said input and output ports of said optical switching matrix are reserved, and which said input and output ports of said optical switching matrix are free.

15. The method of claim 1, wherein said optical cross-connect functionality is integrated into any all optical, fixed or variable length, synchronous or asynchronous packet switching apparatus.

16. An optical packet router, comprising:

an optical switching matrix with a plurality of inputs and outputs for switching a plurality of wavelengths from an input port to an output port; and a resource management mechanism that functions as an optical packet router and as an optical cross-connect and wherein the resource management mechanism provides mapping information to control the optical switching matrix on mapping an optical path from an input port to an output port when the resource management mechanism is functioning as an optical cross-connect and wherein the mapping information also includes a duration of the optical path when the resource management mechanism is functioning as an optical packet router.

17. The optical packet router of claim 16, wherein the duration of the optical path is a short amount of time required to switch a particular optical burst packet through the optical packet switching matrix.

18. The optical packet router of claim 17, further comprising:

a database that includes port availability information, wherein the resource management mechanism uses the database to determine availability of an output port.

19. The optical packet router of claim 18, wherein the resource management mechanism requests closing of an optical path from an input port to an output port within an optical switching matrix when functioning as an optical cross-connect.

* * * * *